(12) United States Patent
Utsunomiya et al.

(10) Patent No.: US 12,497,700 B2
(45) Date of Patent: Dec. 16, 2025

(54) AQUEOUS SURFACE TREATMENT AGENT AND SURFACE-TREATED METAL

(71) Applicant: NIPPON PAINT SURF CHEMICALS CO., LTD., Tokyo (JP)

(72) Inventors: Akira Utsunomiya, Tokyo (JP); Shota Sasaki, Tokyo (JP); Yuko Wada, Tokyo (JP); Ayako Obora, Tokyo (JP)

(73) Assignee: NIPPON PAINT SURF CHEMICALS CO., LTD., Tokyo (JP)

( * ) Notice: Subject to any disclaimer, the term of this patent is extended or adjusted under 35 U.S.C. 154(b) by 0 days.

(21) Appl. No.: 19/119,702

(22) PCT Filed: Dec. 13, 2023

(86) PCT No.: PCT/JP2023/044590
§ 371 (c)(1),
(2) Date: Apr. 9, 2025

(87) PCT Pub. No.: WO2024/135489
PCT Pub. Date: Jun. 27, 2024

(65) Prior Publication Data
US 2025/0263842 A1    Aug. 21, 2025

(30) Foreign Application Priority Data
Dec. 19, 2022  (JP) .................... 2022-202492

(51) Int. Cl.
| | |
|---|---|
| C23C 22/30 | (2006.01) |
| C23C 22/50 | (2006.01) |
| C23C 22/52 | (2006.01) |
| C23C 22/56 | (2006.01) |
| H01M 50/119 | (2021.01) |
| H01M 50/124 | (2021.01) |
| C23C 22/00 | (2006.01) |

(52) U.S. Cl.
CPC .............. *C23C 22/56* (2013.01); *C23C 22/50* (2013.01); *C23C 22/52* (2013.01); *H01M 50/119* (2021.01); *H01M 50/124* (2021.01)

(58) Field of Classification Search
CPC ..................... C23C 2222/10; C23C 22/30
See application file for complete search history.

(56) References Cited

U.S. PATENT DOCUMENTS

| | | |
|---|---|---|
| 2003/0015258 A1 | 1/2003 | Nishimura |
| 2025/0003077 A1 | 1/2025 | Sasaki et al. |

FOREIGN PATENT DOCUMENTS

| | | |
|---|---|---|
| CN | 1386805 A | 12/2002 |
| CN | 102877054 A | 1/2013 |
| JP | 7-76783 A | 3/1995 |
| JP | 2002-69660 A | 3/2002 |
| JP | 2011-52298 A | 3/2011 |
| JP | 2016-204691 A | 12/2016 |
| WO | WO-2023/037926 A1 | 3/2023 |

OTHER PUBLICATIONS

Yaozong, Geng "Modern water-based coatings: technology, formulation, and application," Beijing: China Petrochemical Press, Mar. 2003, p. 206, vol. No. 1, Published by China Petrochemical Press, Beijing, China (with English translataion).
First Office Action mailed Oct. 17, 2024 issued in counterpart China Application No. 202380014507.X (with English translation).
Second Office Action mailed Dec. 28, 2024 issued in counterpart China Application No. 202380014507.X (with English translation).

*Primary Examiner* — Lois L Zheng
(74) *Attorney, Agent, or Firm* — MUNCY, GEISSLER, OLDS & LOWE, P.C.

(57) ABSTRACT

The present invention provides an aqueous surface treatment agent which is used for surface treatment of a metal and contains a trivalent chromium compound (A), a water-soluble or water-dispersible acrylic resin (B), a polyfunctional epoxy compound (C) and a phosphoric acid compound (D), wherein: the water-soluble or water-dispersible acrylic resin (B) has a weight average molecular weight of 30,000 to 1,000,000 and a solid acid value of 500 mgKOH/g to 780 mgKOH/g; the ratio of the mass of trivalent chromium contained in the trivalent chromium compound (A) to the total mass of solids is 3% to 15%; the ratio of the mass of solid content of the polyfunctional epoxy compound (C) to the total mass of solids is 1% to 15%; and the ratio of the mass of solid content of the phosphoric acid compound (D) to the total mass of solids is 5% to 25%.

7 Claims, No Drawings

AQUEOUS SURFACE TREATMENT AGENT AND SURFACE-TREATED METAL

TECHNICAL FIELD

The present invention relates to an aqueous surface treatment agent and a surface-treated metal.

BACKGROUND ART

Conventionally, in order to protect a metal and to provide a design, a metal is laminated by adhering a laminate film to the metal.

In order to maintain aesthetic appearance and corrosion resistance of a laminated metal, it is important to improve adhesion of the laminated film, and for example, a method of forming a chemically treated layer on one surface or both surfaces of an aluminum foil is known.

On the other hand, in addition to excellent processability, corrosion resistance, barrier properties, and the like, a laminated film is less likely to generate a volatile organic compound when laminating a metal, and therefore, the laminated metal can be applied to, for example, a battery exterior material (see Patent Document 1). There, the chemically treated layer includes a trivalent chromium compound, a polycarboxylic acid-based polymer, a compound having an oxazoline group, and a phosphorus compound.

CITATION LIST

Patent Document

Patent Document 1: Japanese Unexamined Patent Application, Publication No. 2011-52298

DISCLOSURE OF THE INVENTION

Problems to be Solved by the Invention

Here, in the case of applying the laminated metal to a battery exterior material, improving electrolytic solution resistance is desired. In particular, when a metal is heat laminated, improving electrolytic solution resistance is desired.

An object of the present invention is to provide an aqueous surface treatment agent capable of improving electrolytic solution resistance when laminating a metal.

Means for Solving the Problems (1) An aqueous surface treatment agent for use in metal surface treatment, including: a trivalent chromium compound (A); a water-soluble or water-dispersible acrylic resin (B); a polyfunctional epoxy compound (C); and a phosphoric acid compound (D), in which the water-soluble or water-dispersible acrylic resin (B) has a weight average molecular weight of 30,000 or more and 1,000,000 or less and a solid content acid value of 500 mgKOH/g or more and 780 mgKOH/g or less, a ratio of a mass of trivalent chromium contained in the trivalent chromium compound (A) to a total solid content by mass is 3% or more and 15% or less, a ratio of a solid content by mass of the polyfunctional epoxy compound (C) to the total solid content by mass is 1% or more and 15% or less, and a ratio of a solid content by mass of the phosphoric acid compound (D) to the total solid content by mass is 5% or more and 25% or less.

(2) The aqueous surface treatment agent as described in (1), in which the water-soluble or water-dispersible acrylic resin (B) has a solid content hydroxy value of 20 mgKOH/g or less.

(3) A surface-treated metal having a coating formed by surface-treating a metal with the aqueous surface treatment agent as described in (1) or (2).

(4) The surface-treated metal as described in (3), in which the metal is aluminum or an aluminum alloy, iron or an iron alloy, or copper or a copper alloy.

(5) The surface-treated metal as described in (3) or (4), in which the metal is plated.

(6) The surface-treated metal as described in any one of (3) to (5), in which the metal having a coating is laminated.

(7) The surface-treated metal as described in (6), in which the surface-treated metal is a battery exterior material.

Effects of the Invention

According to the present invention, it is possible to provide an aqueous surface treatment agent capable of improving electrolytic solution resistance when laminating a metal.

PREFERRED MODE FOR CARRYING OUT THE INVENTION

Hereinafter, embodiments of the present invention will be described.

[Aqueous Surface Treatment Agent] The aqueous surface treatment agent of the present embodiment is used for surface treatment of a metal.

The metal is not particularly limited, and examples thereof include aluminum, iron, copper, zinc, nickel, etc., and two or more types thereof may be used in combination. That is, the metal may be an alloy. The alloy component may contain, for example, carbon, nitrogen, oxygen, phosphorus, sulfur, silicon, manganese, chromium, titanium, molybdenum, or the like. Among these, aluminum or an aluminum alloy, iron or an iron alloy, or copper or a copper alloy is preferable, and aluminum or an aluminum alloy is more preferable from the viewpoint of processability and adhesion.

Examples of the aluminum alloy include an Al—Cu-based alloy, an Al—Mn-based alloy, an Al—Si-based alloy, an Al—Mg-based alloy, an Al—Mg—Si-based alloy, an Al—Zn—Mg-based alloy, aluminum die-casting (ADC material), etc. Examples of the aluminum alloy for battery exterior materials include 8079 material, etc., examples of the aluminum alloy for beverage/food can bodies include 3004 material, 3104 material, 3005 material, etc., examples of the aluminum alloy for beverage/food can lid materials include 5052 material, 5182 material, etc., examples of the aluminum alloy for dry battery containers include 1050 material, 1100 material, 1200 material, etc., and examples of the aluminum alloy for electrode materials include 8021 material, etc.

Examples of the iron alloy include cold rolled steel sheets such as SPCC, SPCD, SPCE, etc., stainless steel (SUS), etc. Examples of the SUS include austenitic stainless steel such as SUS304, SUS301, SUS316, etc., ferritic stainless steel such as SUS430, etc., and martensitic stainless steel such as SUS410 etc.

Examples of the copper alloy include brass, etc. Examples of the zinc alloy include a Zn—Al-based alloy, etc. Examples of the nickel alloy include a Ni—P alloy, etc.

Metal to be surface-treated may be plated. Examples of the plating species include metals such as nickel, zinc, chromium, iron, tin, copper, silver, platinum, gold, etc., and two or more types thereof may be used in combination. Examples of plating methods include electroplating, electroless plating, hot-dip plating, vacuum deposition, sputtering, ion plating, etc. Examples of the plated metal include Ni-plated steel, Ni-plated copper, Zn-plated steel, and Zn—Ni-plated steel. Examples of metal base materials to be plated include cold rolled steel sheets such as SPCC, SPCD, SPCE, etc., copper sheets, etc.

The aqueous surface treatment agent of the present embodiment includes a trivalent chromium compound (A), a water-soluble or water-dispersible acrylic resin (B), a polyfunctional epoxy compound (C), and a phosphoric acid compound (D). Here, the aqueous surface treatment agent of the present embodiment is preferably a hexavalent chromium-free aqueous surface treatment agent that does not contain a hexavalent chromium compound.

The aqueous surface treatment agent of the present embodiment may contain hexavalent chromium. In this case, the content of hexavalent chromium in the aqueous surface treatment agent of the present embodiment is, for example, less than 0.04 mass %, less than 0.02 mass %, less than 0.01 mass %, less than 0.001 mass %, less than 0.0001 mass %, less than 0.00001 mass %, or less than 0.000001 mass %. The content of hexavalent chromium in the aqueous surface treatment agent of the present embodiment is minimized, that is, preferably is a trace amount, and most preferably is 0% by mass. The coating formed by surface-treating a metal with the aqueous surface treatment agent of the present embodiment preferably does not substantially contain hexavalent chromium, and most preferably does not contain hexavalent chromium.

If a metal is surface-treated with the aqueous surface treatment agent of the present embodiment, followed by lamination, the electrolytic solution resistance is improved. Although the reason why the electrolytic solution resistance is improved is unclear, for example, the following reasons are presumed. When the coating formed on the surface of the metal and the laminate film are adhered to each other via an adhesive layer, hydroxy groups generated by hydrolysis of the polyfunctional epoxy compound (C) contained in the coating and the resin contained in the adhesive used to form the adhesive layer are chemically crosslinked or physically crosslinked. As a result, the intrusion and penetration of the electrolytic solution are suppressed, and the adhesion between the film and the adhesive layer can be maintained for a long period of time.

The weight average molecular weight of the water-soluble or water-dispersible acrylic resin (B) is 30,000 or more and 1,000,000 or less, and more preferably 50,000 or more and 800,000 or less. When the weight average molecular weight of the water-soluble or water-dispersible acrylic resin (B) is less than 30,000, the adhesiveness of the laminate film decreases when laminating a metal. When the weight average molecular weight exceeds 1,000,000, the storage stability of the aqueous surface treatment agent deteriorates.

The weight average molecular weight of the water-soluble or water-dispersible acrylic resin (B) is a molecular weight determined by a GPC method using polyethylene oxide as a standard substance.

The solid content acid value of the water-soluble or water-dispersible acrylic resin (B) is 500 mgKOH/g or more and 780 mgKOH/g or less, preferably 600 mgKOH/g or more and 780 mgKOH/g or less, and more preferably 700 mgKOH/g or more and 780 mgKOH/g or less. When the solid content acid value of the water-soluble or water-dispersible acrylic resin (B) is less than 500 mgKOH/g, the electrolytic solution resistance decreases when laminating a metal, and when it exceeds 780 mgKOH/g, the electrolytic solution resistance decreases when laminating a metal.

In the present specification and claims, the solid content acid value and the later-described solid content hydroxy value of the water-soluble or water-dispersible acrylic resin (B) can be measured according to JIS K 0070. The solid content acid value and the solid content hydroxy value of the water-soluble or water-dispersible acrylic resin (B) can be controlled to desired values by adjusting the type and charging ratio of each monomer constituting a monomer composition to be used for polymerization.

The ratio of a mass of trivalent chromium contained in the trivalent chromium compound (A) to the total solid content by mass of the aqueous surface treatment agent of the present embodiment is 3% or more and 15% or less, and preferably 5% or more and 12% or less. When the ratio of the mass of trivalent chromium contained in the trivalent chromium compound (A) to the solid content by mass of the aqueous surface treatment agent of the present embodiment is less than 3% or more than 15%, the electrolytic solution resistance deteriorates when laminating a metal.

The ratio of a solid content by mass of the polyfunctional epoxy compound (C) to the total solid content by mass of the aqueous surface treatment agent of the present embodiment is 1% or more and 15% or less, and preferably 3% or more and 10% or less. When the ratio of the solid content by mass of the polyfunctional epoxy compound (C) to the total solid content by mass of the aqueous surface treatment agent is less than 1% or more than 15%, the electrolytic solution resistance deteriorates when laminating a metal.

The ratio of a mass of trivalent chromium contained in the trivalent chromium compound (A) to the polyfunctional epoxy compound (C) of the aqueous surface treatment agent of the present embodiment is preferably 0.1 or more and 20 or less, and more preferably 0.4 or more and 15 or less. When the ratio of the mass of trivalent chromium contained in the trivalent chromium compound (A) to the mass of the polyfunctional epoxy compound (C) of the aqueous surface treatment agent is 0.1 or more, the electrolytic solution resistance is improved when laminating a metal. This is presumably due to improved hydrofluoric acid resistance. On the other hand, when the ratio of the mass of trivalent chromium contained in the trivalent chromium compound (A) to the polyfunctional epoxy compound (C) of the aqueous surface treatment agent is 20 or less, the electrolytic solution resistance is improved when laminating a metal. This is presumably because the adhesion between the coating and the metal is improved, or the adhesion between the coating and the laminate film or the adhesive layer is improved.

The ratio of a solid content by mass of the phosphoric acid compound (D) to the total solid content by mass of the aqueous surface treatment agent of the present embodiment is 5% or more and 25% or less, and preferably 10% or more and 20% or less. When the ratio of the solid content by mass of the polyfunctional epoxy compound (C) to the total solid content by mass of the aqueous surface treatment agent is less than 5% or more than 25%, the electrolytic solution resistance deteriorates when laminating a metal.

The trivalent chromium compound (A) is not particularly limited, and examples thereof include chromium (III) fluoride, chromium (III) nitrate, chromium (III) phosphate, chromium (III) acetate, chromium (III) chloride, chromium (III) sulfate, chromium (III) oxalate, chromium (III) formate, chromium (III) hydroxide, chromium (III) oxide, chromium (III) bromide, chromium (III) iodide, etc. and two or more types thereof may be used in combination.

Examples of commercially available products of the trivalent chromium compound (A) include chromium phosphate 2M (manufactured by Nippon Chemical Industrial Co., Ltd.).

The water-soluble or water-dispersible acrylic resin (B) contains, for example, a structural unit derived from a monomer having a carboxy group.

Examples of the monomer having a carboxy group include, but are not particularly limited to, (meth)acrylic acid, crotonic acid, isocrotonic acid, (meth)acrylic acid dimer, ε-caprolactone adduct of (meth)acrylic acid, etc. Examples of the monomer having a carboxy group other than those described above include unsaturated dibasic acids such as maleic acid, fumaric acid, itaconic acid, etc., and half esters, half amides, half thioesters, etc. thereof. Two or more types thereof may be used in combination.

The water-soluble or water-dispersible acrylic resin (B) is preferably poly(meth)acrylic acid, and more preferably polyacrylic acid, from the viewpoint of electrolytic solution resistance when laminating a metal.

Examples of commercially available products of polyacrylic acid include Jurymer AC-10L, AC-10H, AC-20L, and SH-5 (all from Toagosei).

The water-soluble or water-dispersible acrylic resin (B) may further contain a structural unit derived from a monomer having a hydroxy group.

The monomer having a hydroxy group is not particularly limited, and examples thereof include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 1,4-cyclohexanedimethanol mono(meth)acrylate, glycerin mono(meth)acrylate, (meth)allyl alcohol, N-methylol (meth)acrylamide, N-(2-hydroxyethyl)acrylamide, N-(2-hydroxypropyl)acrylamide, an ε-caprolactone adduct of 2-hydroxyethyl(meth)acrylate, etc. Two or more types thereof may be used in combination.

The water-soluble or water-dispersible acrylic resin (B) preferably has a solid content hydroxy value of 20 mgKOH/g or less, more preferably 10 mgKOH/g or less, and still more preferably 0 mgKOH/g. When the water-soluble or water-dispersible acrylic resin (B) has a solid content hydroxy value of 20 mgKOH/g or less, the electrolytic solution resistance is improved when laminating a metal, and storage stability of the aqueous surface treatment agent is improved.

The water-soluble or water-dispersible acrylic resin (B) may further contain a structural unit derived from a monomer (another monomer) other than those described above.

The other monomers include, but are not limited to, methyl (meth)acrylate, ethyl (meth)acrylate, n-propyl (meth)acrylate, 1-methylethyl (meth)acrylate, n-butyl (meth)acrylate, isobutyl (meth)acrylate, t-butyl (meth)acrylate, 2-ethylhexyl (meth)acrylate, lauryl (meth)acrylate, phenyl (meth)acrylate, isobornyl (meth)acrylate, cyclohexyl (meth)acrylate, t-butylcyclohexyl (meth)acrylate, dicyclopentadienyl (meth)acrylate, dihydrodicyclopentadienyl (meth)acrylate, methoxypolyethylene (meth)acrylate, etc. Examples of monomers other than those described above include styrene, α-methylstyrene, vinyl ketone, t-butylstyrene, p-chlorostyrene, vinylnaphthalene, acrylonitrile, methacrylonitrile, ethylene, propylene, vinyl acetate, vinyl propionate, butadiene, isoprene, etc., and two or more thereof may be used in combination.

The water-soluble or water-dispersible acrylic resin (B) is obtained, for example, by radical polymerization of a monomer composition containing a monomer having a carboxy group, using a polymerization initiator as necessary.

The radical polymerization method is not particularly limited, and examples thereof include a solution polymerization method, an emulsion polymerization method, a suspension polymerization method, etc.

The polymerization temperature is not particularly limited, but is, for example, 60° C. or higher and 160° C. or lower. The polymerization time is not particularly limited, and is, for example, 2 hours or more and 10 hours or less.

The polymerization initiator is not particularly limited, and examples thereof include 4,4'-azobis(4-cyanovaleric acid), 2,2'-azobis(2-methylpropionamidine) dihydrochloride, 2,2'-azobis-2-(2-imidazolin-2-yl)propane hydrochloride, ammonium peroxodisulfate, sodium peroxodisulfate, potassium peroxodisulfate, etc.

Acid groups and hydroxy groups in the water-soluble or water-dispersible acrylic resin (B) may be those generated or added by modifying the acrylic resin.

The ratio of a solid content by mass of the water-soluble or water-dispersible acrylic resin (B) to the total solid content by mass of the aqueous surface treatment agent of the present embodiment is not particularly limited, but is, for example, 15% or more and 63% or less.

The polyfunctional epoxy compound (C) is a water-soluble or water-dispersible low molecular compound having a plurality of epoxy groups. The molecular weight of the polyfunctional epoxy compound (C) is not particularly limited, but is, for example, 100 or more and 1,000 or less. The number of epoxy groups of the polyfunctional epoxy compound is not particularly limited, but is, for example, 2 or more and 4 or less.

Examples of the polyfunctional epoxy compound (C) include, but are not limited to, ethylene glycol diglycidyl ether, resorcinol diglycidyl ether, neopentyl glycol diglycidyl ether, 1,6-hexanediol diglycidyl ether, 1,4-butanediol diglycidyl ether, sorbitol polyglycidyl ether, pentaerythritol polyglycidyl ether, glycerol polyglycidyl ether, diglycerol polyglycidyl ether, propylene glycol diglycidyl ether, triglycidyl isocyanurate, bisphenol A diglycidyl ether, hydrogenated bisphenol A diglycidyl ether, etc., and two or more types thereof may be used in combination.

Commercially available products of the polyfunctional epoxy compound (C) include, for example, Denacol EX-614B, Denacol EX-313 (manufactured by Nagase ChemteX), SR-HBA (manufactured by Sakamoto Yakuhin Kogyo), and the like.

The phosphoric acid compound (D) is not particularly limited, and examples thereof include phosphoric acid, condensed phosphoric acid, phosphate salts, condensed phosphate salts, etc., and two or more types thereof may be used in combination. Among these, phosphoric acid is preferable. Examples of the condensed phosphoric acid include pyrophosphoric acid, tripolyphosphoric acid, trimetaphosphoric acid, tetrametaphosphoric acid, ultraphosphoric acid, etc. Examples of the salts in the phosphate salts or condensed phosphate salts include an alkali metal salt, an ammonium salt, etc.

The content of water in the aqueous surface treatment agent of the present embodiment is not particularly limited, but is, for example, 50% by mass or more and 99.9% by mass or less.

The pH of the aqueous surface treatment agent of the present embodiment is not particularly limited, but is, for example, 1 or more and 4 or less.

The aqueous surface treatment agent of the present embodiment may further contain an organic solvent miscible with water, if necessary, in order to adjust a concentration of the solid component and drying rate. The organic solvent miscible with water is not particularly limited, and examples thereof include ketone-based solvents such as acetone, methyl ethyl ketone, etc.; amide-based solvents such as N,N'-dimethylformamide, dimethylacetamide, etc.; alcoholic solvents such as methanol, ethanol, isopropyl alcohol, 1-methoxy-2-propanol, etc.; ether-based solvents such as ethylene glycol monobutyl ether, ethylene glycol monohexyl ether, etc.; and pyrrolidone-based solvents, such as 1-methyl-2-pyrrolidone, 1-ethyl-2-pyrrolidone, etc.

The aqueous surface treatment agent of the present embodiment may further contain known additives such as a surface modifier, an antifoaming agent, a plasticizer, an antioxidant, an antimicrobial agent, a coloring agent, etc., if necessary.

Examples of the surface modifier include nonionic or cationic surfactants, adducts of polyacetylene glycol with polyethylene oxide or polypropylene oxide, acetylene glycol compounds, etc.

Examples of the antifoaming agent include mineral oil-based antifoaming agents, fatty acid-based antifoaming agents, silicone-based antifoaming agents, etc.

Examples of the plasticizer include 2,2,4-trimethyl-1,3-pentanediol monoisobutyrate, diethylene glycol monobutyl ether acetate, ethylene glycol monobutyl ether, dipropylene glycol n-butyl ether, diethylene glycol dibutyl ether, etc.

Examples of the antioxidant include a phenol-based antioxidant, a phosphorus-based antioxidant, a sulfur-based antioxidant, etc. Specifically, examples of the antioxidant include 2,6-di-t-butylphenol, 2,4-dimethyl-6-t-butylphenol, butylhydroxytoluene (BHT), 2,6-di-t-butyl-4-ethylphenol, 2,4,6-tri-t-butylphenol, 2,6-di-t-butyl-4-s-butylphenol, butylhydroxyanisole (BHA), tocopherol, 2,6-di-t-butyl-4-hydroxymethylphenol, n-octadecyl-β-(4'-hydroxy-3',5'-di-t-butylphenyl)propionate, 2,6-di-t-butyl-4-(N,N-dimethylaminomethyl)phenol, diethyl 3,5-di-t-butyl-4-hydroxybenzylphosphonate, propyl gallate, octyl gallate, lauryl gallate, 2,2'-methylenebis(4-methyl-6-t-butylphenol), 2,2'-methylenebis(4-ethyl-6-t-butylphenol), 4,4'-methylenebis(2,6-di-t-butylphenol), 2,2'-methylenebis(4-methyl-6-cyclohexylphenol), 2,2'-dihydroxy-3,3'-bis(α-methylcyclohexyl)-5,5'-dimethyldiphenylmethane, 2,2'-methylenebis(6-α-methylbenzyl-p-cresol), 2,2'-ethylidenebis (4,6-di-t-butylphenol), 2,2'-butylidenebis(4-methyl-6-t-butylphenol), 4,4'-butylidenebis(3-methyl-6-t-butylphenol), triethylene glycol bis[3-(3-t-butyl-4-hydroxy-5-methylphenyl)propionate], 1,6-hexanediol bis[3-(3,5-di-t-butyl-4-hydroxyphenyl)propionate], bis[2-t-butyl-4-methyl-6-(3-t-butyl-5-methyl-2-hydroxybenzyl)phenyl]terephthalate, 3,9-bis[2-{3-(3-t-butyl-4-hydroxy-5-methylphenyl)propionyloxy}-1,1-dimethylethyl]-2,4,8,10-tetraoxaspiro[5,5]undecane, 4,4'-thiobis(6-t-butyl-m-cresol), 4,4'-thiobis (3-methyl-6-t-butylphenol), 2,2'-thiobis(4-methyl-6-t-butylphenol), bis(3,5-di-t-butyl-4-hydroxybenzyl)sulfide, 4,4'-thiobis(2,6-di-t-butylphenol), 2,2-thiodiethylenebis[3-(3,5-di-t-butyl-4-hydroxyphenyl)propionate], 2,4-bis(n-octylthio)-6-(4-hydroxy-3',5'-di-t-butylanilino)-1,3,5-triazine, N,N'-hexamethylenebis-(3,5-di-t-butyl-4-hydroxyhydrocinnamide, N,N'-bis[3-(3,5-di-t-butyl-4-hydroxyphenyl)propionyl]hydrazine, calcium (3,5-di-t-butyl-4-hydroxybenzylmonoethylphosphonate), alkylated bisphenol, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tris(3,5-di-t-butyl-4-hydroxyphenyl)isocyanurate, tris(3,5-di-t-butyl-4-hydroxybenzyl)isocyanurate, 1,3,5-tris(4-t-butyl-3-hydroxy-2,6-dimethylbenzyl)isocyanurate, 1,3,5-tris[{3-(3,5-di-t-butyl-4-hydroxyphenyl)propionyloxy}ethyl]isocyanurate, tetrakis[methylene-3-(3',5'-di-t-butyl-4-hydroxyphenyl)propionate]methane, bis[3,3-bis(3-t-butyl-4-hydroxyphenyl)butyrate]ethylene, triphenylphosphite, diphenylnonylphenylphosphite, tris(2,4-di-t-butylphenyl)phosphite, tris(nonylphenyl)phosphite, tris(mono and dinonylphenyl)phosphite, diphenylisooctylphosphite, 2,2'-methylenebis (4,6-di-t-butylphenyl)octylphosphite, diphenylisodecylphosphite, diphenylmonotridecylphosphite, 2,2'-ethylidenebis (4,6-di-t-butylphenol)fluorophosphite, phenyldiisodecylphosphite, phenylditridecylphosphite, tris (2-ethylhexyl)phosphite, triisodecylphosphite, tris (tridecyl) phosphite, dibutyl hydrogen phosphite, trilauryl trithiophosphite, tetrakis(2,4-di-t-butylphenyl)-4,4'-biphenylene diphosphonite, 4,4'-isopropylidene diphenol alkyl (C12 to C15)phosphite, 4,4'-butylidene bis(3-methyl-6-t-butylphenyl) ditridecyl phosphite, distearylpentaerythritol diphosphite, bis(nonylphenyl)pentaerythritol diphosphite, bis(2,4-di-t-butylphenyl)pentaerythritol diphosphite, cyclic neopentanetetraylbis(2,6-di-t-butyl-4-methylphenylphosphite, phenylbisphenol A pentaerythritol diphosphite, tetraphenyldipropylene glycol diphosphite, 1,1,3-tris(2-methyl-4-di-tridecylphosphite-5-t-butylphenyl)butane, tetraphenyltetradecylpentaerythritol tetraphosphite, zinc dialkyldithiophosphate (ZnDTP), 3,4,5,6-dibenzo-1,2-oxaphosphane-2-oxide, diethyl 3,5-di-t-butyl-4-hydroxybenzylphosphonate, hydrogenated bisphenol A phosphite polymer, dilauryl 3,3'-thiodipropionate (DLTTDP), ditridecyl 3,3'-thiodipropionate, dimyristyl 3,3'-thiodipropionate (DMTDP), distearyl 3,3'-thiodipropionate (DSTDP), lauryl stearyl 3,3'-thiodipropionate, pentaerythritol tetrakis (β-laurylthiopropionate), stearylthiopropionamide, bis[2-methyl-4-(3-n-alkyl(C12 to C14)thiopropionyloxy)-5-t-butylphenyl]sulfide, dioctadecyldisulfide, 2-mercaptobenzimidazole, 2-mercapto-6-methylbenzimidazole, 1,1'-thiobis (2-naphthol), etc.

Examples of the antimicrobial agent include, for example, zinc pyrithione, 2-(4-thiazolyl)benzimidazole, 1,2-benzisothiazoline, 2-n-octyl-4-isothiazolin-3-one, N-(fluorodichloromethylthio)phthalimide, N,N-dimethyl-N'-phenyl-N'-(fluorodichloromethylthio)sulfamide, methyl 2-benzimidazolecarbamate, bis(dimethylthiocarbamoyl)disulfide, N-(trichloromethylthio)-4-cyclohexene-1,2-dicarboximide, barium metaborate, allyl isothiocyanate; quaternary ammonium salts such as polyoxyalkylene trialkylammonium, organosilicone quaternary ammonium salts, etc.; quaternary phosphonium salts such as tri-n-butyltetradecylphosphonium chloride, etc.; polyphenol-based antimicrobial agents, phenylamide-based antimicrobial agents, biguanide-based antimicrobial agents, etc.

Examples of the colorant include organic pigments such as quinacridone-based, anthraquinone-based, perylene-based, perinone-based, diketo-pyrrolo-pyrrole-based, isoindolinone-based, condensed azo-based, benzimidazolone-based, monoazo-based, insoluble azo-based, naphthol-based, flavanthrone-based, anthrapyrimidine-based, quinophthalone-based, pyranthrone-based, pyrazolone-based, thioindigo-based, anthanthrone-based, dioxazine-based, phthalocyanine-based, and indanthrone-based organic pigments, etc.; metal complexes such as nickel dioxine yellow, copper azomethine yellow, etc.; metal oxides such as titanium oxide, iron oxide, zinc oxide, etc.; metal salts such as barium sulfate, calcium carbonate; etc.; pigments such as inorganic pigments such as carbon black, aluminum, mica, etc.; dyes such as azo-based, quinoline-based, stilbene-based, thiazole-based, indigoid-based, anthraquinone-based, oxazine-based dyes, etc.

[Surface-Treated Metal]

The surface-treated metal of the present embodiment has a coating formed by surface-treating a metal with the aqueous surface treatment agent of the present embodiment.

The shape of the metal is not particularly limited, and examples thereof include a foil-like shape, a plate-like shape, etc. When a foil-like or plate-like metal is used, one surface may be treated with the aqueous surface treatment agent of the present embodiment, or both surfaces may be treated with the aqueous surface treatment agent of the present embodiment. When both surfaces are surface-treated with the aqueous surface treatment agent of the present embodiment, they may be surface-treated with the same aqueous surface treatment agent, or may be surface-treated with different aqueous surface treatment agents.

In the surface-treated metal of the present embodiment, the metal having a coating may be laminated. That is, a laminate film may be adhered to the coating formed by surface-treating the metal. When a foil-like or plate-like metal is used, a laminate film may be adhered to one surface, or may be adhered to both surfaces. When a laminate film is adhered to both surfaces, the same laminate film may be adhered to both surfaces, or different laminate films may be bonded to both surfaces.

A material constituting the laminate film is not particularly limited, and examples thereof include polyethylene-based resins, polypropylene-based resins, polycarbonate-based resins, polyvinyl alcohol-based resins, polyvinyl acetal-based resins, polyvinylidene chloride-based resins, polyvinyl acetate-based resins, polyethylene terephthalate-based resins, polyethylene naphthalate-based resins, polybutylene terephthalate-based resins, polyethylene isophthalate-based resins, copolymerized polyester-based resins, polyester-based resins, polyamide-based resins, polyimide-based resins, polyetherimide-based resins, polyphenylene sulfide-based resins, fluorine-based resins, silicone-based resins, nylon-based resins, phenol-based resins, (meth)acrylic-based resins, epoxy-based resins, polymetaxylylene adipamide-based resins, etc., and two or more types thereof may be used in combination.

The laminate film may be uniaxially stretched or biaxially stretched.

As the laminate film, a single layer film may be used or a multilayer film may be used. The multilayer film may include a plurality of films laminated via an adhesive or not via an adhesive. The adhesive may be a one-component curable adhesive or a two-component curable adhesive. Examples of the resin component constituting the adhesive include polyester-based resins, polyether-based resins, polyurethane-based resins, epoxy-based resins, phenol-based resins, polyamide-based resins, polyolefin-based resins, polyvinyl acetate-based resins, cellulose-based resins, (meth)acrylic resins, polyimide-based resins, amino-based resins, rubbers, and silicone-based resins. A method of laminating a plurality of films without using an adhesive is not particularly limited, and examples thereof include a coextrusion method, a sand lamination method, a thermal lamination method, etc.

The surface-treated metal of the present embodiment may have a layer (hereinafter, referred to as another layer) other than the coating and the laminate film. The other layer may be present between the coating and the laminate film or may be present on the laminate film. In addition, the surface-treated metal of the present embodiment does not have a laminate film adhered to the metal having the coating, and has the other layer on the coating.

The other layer is not particularly limited, and examples thereof include known layers such as an adhesive layer, a coating film, a hard coat layer, an antifouling layer, an antiglare layer, a design layer, a printing layer, a polarizing plate, a coloring layer, a liquid crystal layer, a light guide plate, a transparent conductive film, a spacer, etc., and two or more types thereof may be used in combination.

The adhesive layer may be formed of a one-component adhesive or a two-component adhesive.

Examples of a resin that constitutes the adhesive that can be used for forming the adhesive layer include polyolefin-based resins, polyester-based resins, polyether-based resins, polyurethane-based resins, polycarbonate-based resins, epoxy-based resins, phenol-based resins, polyamide-based resins, polyvinyl acetate-based resins, cellulose-based resins, (meth)acrylic resins, polyimide-based resins, amino-based resins, chloroprene rubber resins, nitrile rubber-based resins, styrene-butadiene rubber-based resins, silicone-based resins, fluorinated ethylene-propylene copolymer-based resins, etc., and two or more types thereof may be used in combination. Examples of the combination of resins to be used in combination include polyurethane-based resins and modified polyolefin-based resins, polyamide-based resins and acid-modified polyolefin-based resins, polyamide-based resins and metal-modified polyolefin-based resins, polyamide-based resins and polyester-based resins, polyester-based resins and acid-modified polyolefin-based resins, polyester-based resins and metal-modified polyolefin-based resins, etc.

The polyolefin-based resins include acid-modified polyolefin-based resins and metal-modified polyolefin-based resins. Examples of the acid-modified polyolefin-based resins include polyolefin-based resins which have been acid-modified with an unsaturated carboxylic acid or an anhydride thereof, such as maleic anhydride-modified polypropylene. Examples of commercially available products of the acid-modified polypropylene-based resin include Adomer manufactured by Mitsui Chemicals (NB508, NF518, LB548, QB510, QB550, LB458, NF528, LF128, LF308, NF308, NF548, NF558, SF600, SF700, SF731, SF715, SE800, NE060, NE065, NE090, XE070, HE040, QE060, QF500, QF551, QF570, NR106, NS101 etc.); Unistole) manufactured by Mitsui Chemicals (R-200X, R-303XE, E-200EM, A-200PM, A-201PM, H-100, H-200, XP01A, XP01B/11B, XP03F, XP04A, etc.); Modic manufactured by Mitsubishi Chemical Corporation (P502, P512VB, P553A, P674V, P565, P555, P908H511, H503, H514, L502, L504, M142, M512, M522, M545, A543, F502, F573, F534A, etc.); Arrow Base manufactured by Unitika (SB-1200, SE-1200, SD-1200, DA1010, DC-1010, YA-601, etc.); and other products.

The method of forming the adhesive layer is not particularly limited, and examples thereof include an extrusion molding method, a dispersion method, etc.

Examples of applications of the surface-treated metal of the present embodiment include battery exterior materials, food packaging materials, body or lid materials for food cans, body or lid materials for beverage cans, soft packaging materials or surface protection materials including metal foils such as aluminum pouches, battery separators, tab leads, capacitor cases, heat exchangers, electronic device housings, building materials made of metal, bodies, engine components, or chassis components of vehicles, bodies, main wings, frames, fuel tanks, engine turbines, engine fans, or components of aircrafts, bodies, carriages, or components of railway vehicles, ships, rocket components, bicycle parts, vending machines, cage side plates, speed controllers, or hoists of elevators, steps or interior panels of escalators, machine tools, injection molding machines, structural or driving members of industrial robots, semiconductor manufacturing devices, displays, submarines, signals, automated weaving machines, tunnel excavators, pipelines, road signs, power generators, trash incinerators, exhaust gas treatment devices, motors, transformers, electronic circuits, bulbs, photoelectron multipliers, golf clubs, antennas, bolts, nuts, screws, etc. Among these, from the viewpoint of electrolytic solution resistance, a battery exterior material is preferable, and a lithium-ion battery exterior material is particularly preferable.

[Surface Treatment Method]

The surface treatment method of the present embodiment includes a coating-forming step of forming a coating by surface-treating a metal with the aqueous surface treatment agent of the present embodiment.

The coating-forming step includes, for example, drying after the aqueous surface treatment agent of the present embodiment is applied to a surface of a metal.

The application method of the aqueous surface treatment agent of the present embodiment is not particularly limited, and examples thereof include roll coater coating, gravure coater coating, reverse coater coating, slot die coater coating, lip coater coating, knife coater coating, blade coater coating, chamber doctor coater coating, air knife coater coating, curtain coat coating, spin coat coating, brush coating, roller coating, bar coater coating, dip coating, applicator coating, spray coating, flow coating, etc., and two or more types thereof may be used in combination.

A drying method of the aqueous surface treatment agent of the present embodiment is not particularly limited, and examples thereof include a heating drying method such as a method of drying using an oven, a method of drying by forced circulation of hot air, and a method of drying using an electromagnetic induction heating furnace using an IH heater, or the like. The heat drying condition is, for example, 2 seconds or more and 180 seconds or less at a temperature of 40° C. or higher and 230° C. or lower. Here, the conditions such as air volume and air velocity to be set during heating and drying can be arbitrarily set.

In the coating-forming step, the aqueous surface treatment agent of the present embodiment may be dried while applying the aqueous surface treatment agent of the present embodiment to the surface of a metal. For example, the aqueous surface treatment agent of the present embodiment may be applied to the surface of a preheated metal and may be dried.

The amount of the coating formed after drying in the coating-forming step is preferably 0.1 mg/m$^2$ or more and 5,000 mg/m$^2$ or less, and more preferably 1 mg/m$^2$ or more and 500 mg/m$^2$ or less.

The surface treatment method of the present embodiment may further include a laminating step of laminating a metal having a coating.

The method of laminating a metal having a coating is not particularly limited, and examples thereof include a dry lamination method, a heat lamination method, and an extrusion lamination method.

Although the embodiments of the present invention have been described above, the present invention is not limited to the above-described embodiments, and the above-described embodiments may be appropriately modified within the scope of the gist of the present invention.

EXAMPLES

Hereinafter, Examples of the present invention will be described, but the present invention is not limited to the Examples.

Examples 1 to 20 and Comparative Examples 1 to 10

The trivalent chromium compound (A), the water-soluble or water-dispersible acrylic resin (B), the polyfunctional epoxy compound (C), the phosphoric acid compound (D), and ion-exchanged water were mixed to obtain an aqueous surface treatment agent.

In Comparative Example 2, Epocros WS-300 (manufactured by Nippon Shokubai) was used as an oxazoline group-containing water-soluble polymer (aqueous solution) having a solid content of 10% by mass instead of the polyfunctional epoxy compound (C), and a ratio of the solid content by mass of the oxazoline group-containing water-soluble polymer to a total solid content by mass of the aqueous surface treatment agent was set to 5%.

Table 1 shows the types and contents of the trivalent chromium compound (A), the water-soluble or water-dispersible acrylic resin (B), the polyfunctional epoxy compound (C), and the phosphoric acid compound (D).

Here, definitions of abbreviations in Table 1 are shown below.

A1: chromium (III) nitrate
A2: chromium phosphate 2M (manufactured by Nippon Chemical Industrial) (Cr(H$_{1.5}$PO$_4$)$_2$)
A3: chromium (III) fluoride trihydrate
B1: Jurymer AC-10L (manufactured by Toagosei) as polyacrylic acid (aqueous solution), having a solid content of 40% by mass, a weight average molecular weight of 50,000, a solid content acid value of 780 mgKOH/g, and a solid content hydroxy value of 0 mgKOH/g
B2: Jurymer AC-10H (manufactured by Toagosei) as polyacrylic acid (aqueous solution) having a solid content of 20% by mass, a weight average molecular weight of 800,000, a solid content acid value of 780 mgKOH/g, and a solid content hydroxy value of 0 mgKOH/g
B3: Jurymer SH-5 (manufactured by Toagosei) as a polyacrylic acid (aqueous solution) having a solid content of 5% by mass, a weight average molecular weight of 1,000,000, a solid content acid value of 780 mgKOH/g, and a solid content hydroxy value of 0 mgKOH/g
B4: Aron A-10SL (manufactured by Toagosei) as a polyacrylic acid (aqueous solution) having a solid content of 40% by mass, a weight average molecular weight of 5,000, a solid content acid value of 780 mgKOH/g, and a solid content hydroxy value of 0 mgKOH/g
B5: partially neutralized product of B1 as sodium polyacrylate (aqueous solution) having a solid content of 40% by mass, a weight average molecular weight of 50,000, a solid content acid value of 450 mgKOH/g, and a solid content hydroxy value of 0 mgKOH/g
C1: Denacol EX-313 (manufactured by Nagase Chemtex) as a mixture of glycerol diglycidyl ether and glycerol triglycidyl ether C2: Denacol EX-614B (manufactured by Nagase ChemteX) as sorbitol tetraglycidyl ether
C3: SR-HBA (from Sakamoto Yakuhin Kogyo) as hydrogenated bisphenol A diglycidyl ether
D1: phosphoric acid

TABLE 1

| | Trivalent chromium compound (A) | | Water-soluble or water-dispersible acrylic resin | | Polyfunctional epoxy compound (C) | | Phosphoric acid compound (D) | |
|---|---|---|---|---|---|---|---|---|
| | Type | Solid content by mass [%] of Cr(III) | Type | Solid content by mass [%] | Type | Solid content by mass [%] | Type | Solid content by mass [%] |
| Example 1 | A1 | 8 | B1 | 43 | C2 | 4 | D1 | 16 |
| Example 2 | A1 | 8 | B1 | 40 | C1 | 8 | D1 | 15 |
| Example 3 | A1 | 3 | B1 | 63 | C1 | 8 | D1 | 15 |
| Example 4 | A1 | 15 | B1 | 25 | C1 | 1 | D1 | 5 |
| Example 5 | A1 | 10 | B1 | 38 | C1 | 1 | D1 | 15 |
| Example 6 | A1 | 10 | B1 | 27 | C1 | 15 | D1 | 12 |
| Example 7 | A1 | 10 | B1 | 44 | C1 | 5 | D1 | 5 |
| Example 8 | A1 | 12 | B1 | 15 | C1 | 5 | D1 | 25 |
| Example 9 | A2 | 10 | B1 | 30 | C1 | 5 | D1 | 18 |
| Example 10 | A3 | 10 | B1 | 46 | C1 | 5 | D1 | 18 |
| Example 11 | A1 | 10 | B2 | 31 | C1 | 5 | D1 | 18 |
| Example 12 | A1 | 10 | B3 | 31 | C1 | 5 | D1 | 18 |
| Example 13 | A1 | 10 | B1 | 31 | C2 | 5 | D1 | 18 |
| Example 14 | A1 | 10 | B1 | 31 | C3 | 5 | D1 | 18 |
| Example 15 | A1 | 10 | B1 | 31 | C1 | 5 | D1 | 18 |
| Example 16 | A1 | 10 | B1 | 31 | C1 | 5 | D1 | 18 |
| Example 17 | A1 | 10 | B1 | 31 | C1 | 5 | D1 | 18 |
| Example 18 | A1 | 10 | B1 | 31 | C1 | 5 | D1 | 18 |
| Example 19 | A1 | 10 | B1 | 31 | C1 | 5 | D1 | 18 |
| Example 20 | A1 | 10 | B1 | 31 | C1 | 5 | D1 | 18 |
| Comparative Example 1 | A1 | 9 | B1 | 42 | — | — | D1 | 17 |
| Comparative Example 2 | A1 | 9 | B3 | 37 | — | — | D1 | 17 |
| Comparative Example 3 | A1 | 9 | B2 | 50 | C2 | 9 | — | — |
| Comparative Example 4 | A1 | 9 | B1 | 22 | C1 | 20 | D1 | 17 |
| Comparative Example 5 | A1 | 2 | B3 | 65 | C2 | 9 | D1 | 17 |
| Comparative Example 6 | A1 | 18 | B3 | 10 | C2 | 2 | D1 | 6 |
| Comparative Example 7 | A1 | 10 | B1 | 43 | C1 | 8 | D1 | 3 |
| Comparative Example 8 | A1 | 12 | B1 | 8 | C1 | 7 | D1 | 30 |
| Comparative Example 9 | A1 | 10 | B4 | 31 | C1 | 5 | D1 | 18 |
| Comparative Example 10 | A1 | 10 | B5 | 31 | C1 | 5 | D1 | 18 |

[Primary Anticorrosive Treatment (Formation of Coating)]

A metal plate (see Table 2) having a thickness of 40 μm was subjected to a surface treatment with an aqueous surface treatment agent to form a coating. Specifically, the metal plate was degreased at 65° C. for 3 seconds using a 2% by mass diluted solution of Surf Cleaner 330 (manufactured by Nippon Paint Surf Chemicals). Next, the aqueous surface treatment agent was applied using a bar coater (#6), followed by drying using a hot air oven at a material temperature of 190° C. or higher for 2 minutes.

[Dry Lamination Processing]

The metal plate on which the coating was formed was subjected to dry lamination. Specifically, a two-component polyurethane adhesive as a solvent-based adhesive was applied onto the coating formed on the surface of the metal plate so that the coating amount when dried was 3 g/m², and then was dried to form an adhesive layer. Next, under the conditions of 100° C. and 0.38 MPa, a polypropylene film was heat-pressed to the metal plate on which the adhesive layer had been formed, and then aged at 60° C. for 6 days.

[Heat Lamination Processing]

The metal plate on which the coating had been formed was subjected to heat lamination processing. Specifically, a maleic acid-modified polypropylene dispersion as an adhesive was applied onto a coating formed on the surface of a metal plate so that an amount of the coating when dried was 3 g/m², and then was dried to form an adhesive layer. Next, under the conditions of 190° C. and 0.38 MPa, a polypropylene film was heat pressed to the metal plate on which the adhesive layer had been formed.

[Adhesion of Laminate Film]

The laminated metal plate was cut to a size of 150 mm×15 mm to obtain test pieces. Next, using a desktop precision universal tester autograph AGS-5KNX (manufactured by Shimadzu Corporation), peel strength at the time of peeling the polypropylene film from the metal plate of a test piece at an angle of 1800 at a peeling rate of 50 mm/min was measured, and the adhesiveness of the laminate film was evaluated. In actual use, the adhesiveness of the laminate film desirably has a peel strength of 10 N/15 mm or more.

[Electrolytic Solution Resistance]

1,000 ppm of ion-exchanged water was added to an electrolytic solution LBG-00015 (manufactured by Kishida Chemical) in which 1 M $LiPF_6$ was dissolved in a mixed solvent of ethylene carbonate/dimethyl carbonate/diethyl carbonate (volume ratio 1/1/1) to obtain a test electrolytic solution.

A test piece was immersed in the test electrolytic solution at 85° C. for 14 days, and then the peel strength was measured in the same manner as described above to evaluate the electrolytic solution resistance. In actual use, the electrolytic solution resistance desirably has a peel strength of 8 N/15 mm or more.

Table 2 shows the evaluation results of the adhesiveness and the electrolytic solution resistance of the laminated films of laminated metal plates.

Here, definitions of abbreviations in Table 2 are shown below.
Al plate: aluminum alloy sheet (8079 material)
SUS plate: stainless steel sheet (SUS316)
Ni plate: nickel plated steel sheet
EG plate: electro galvanized steel sheet (base material: SPCC)
GI plate: hot dip galvanized steel sheet
SPC plate: cold rolled steel sheet
Cu plate: rolled copper foil

TABLE 2

|  | Metal plate | Peeling strength [N/15 mm] | | | |
|---|---|---|---|---|---|
|  |  | Dry lamination | | Heat lamination | |
|  |  | Adhesiveness | Electrolytic solution resistance | Adhesiveness | Electrolytic solution resistance |
| Example 1 | Al plate | 13 | 12 | 11 | 10 |
| Example 2 | Al plate | 13 | 11 | 11 | 10 |
| Example 3 | Al plate | 13 | 8 | 11 | 8 |
| Example 4 | Al plate | 13 | 10 | 11 | 10 |
| Example 5 | Al plate | 13 | 12 | 11 | 10 |
| Example 6 | Al plate | 12 | 10 | 10 | 9 |
| Example 7 | Al plate | 13 | 10 | 11 | 10 |
| Example 8 | Al plate | 12 | 9 | 10 | 9 |
| Example 9 | Al plate | 13 | 11 | 11 | 10 |
| Example 10 | Al plate | 13 | 11 | 11 | 10 |
| Example 11 | Al plate | 13 | 11 | 11 | 10 |
| Example 12 | Al plate | 13 | 11 | 11 | 10 |
| Example 13 | Al plate | 13 | 11 | 11 | 10 |
| Example 14 | Al plate | 13 | 11 | 11 | 10 |
| Example 15 | SUS plate | 13 | 10 | 11 | 10 |
| Example 16 | Ni plate | 13 | 10 | 11 | 10 |
| Example 17 | EG plate | 13 | 10 | 11 | 10 |
| Example 18 | GI plate | 13 | 10 | 11 | 10 |
| Example 19 | SPC plate | 13 | 10 | 11 | 10 |
| Example 20 | Cu plate | 13 | 10 | 11 | 10 |
| Comparative Example 1 | Al plate | 10 | 7 | 11 | 0 (peeled) |
| Comparative Example 2 | Al plate | 13 | 0 (peeled) | 11 | 0 (peeled) |
| Comparative Example 3 | Al plate | 12 | 0 (peeled) | 11 | 0 (peeled) |
| Comparative Example 4 | Al plate | 13 | 2 | 13 | 2 |
| Comparative Example 5 | Al plate | 12 | 0 (peeled) | 12 | 0 (peeled) |
| Comparative Example 6 | Al plate | 10 | 1 | 11 | 1 |
| Comparative Example 7 | Al plate | 12 | 5 | 12 | 4 |
| Comparative Example 8 | Al plate | 10 | 0 (peeled) | 10 | 0 (peeled) |
| Comparative Example 9 | Al plate | 11 | 4 | 11 | 4 |
| Comparative Example 10 | Al plate | 12 | 2 | 12 | 2 |

From Table 2, it can be seen that the laminated films of the metal plates surface-treated with the aqueous surface treatment agents of Examples 1 to 20 had high adhesiveness and electrolytic solution resistance.

Contrary to this, with the aqueous surface treatment agents of Comparative Examples 1, 2, and 4, the ratios of the solid content by mass of the polyfunctional epoxy compound (C) to the total solid content by mass were 0%, 0%, and 20%, respectively, and thus the laminated metal plates had low electrolytic solution resistance. Here, the aqueous surface treatment agent of Comparative Example 1 provided relatively high electrolytic solution resistance to the dry laminated metal plate, but low electrolytic solution resistance to the heat laminated metal plate. In the aqueous surface treatment agents of Comparative Examples 3, 7, and 8, the ratios of the solid content by mass of the phosphoric acid compound (D) to the total solid content by mass were 0%, 3%, and 30%, respectively, and thus the laminated metal plates had low electrolytic solution resistance. In the aqueous surface treatment agents of Comparative Examples 5 and 6, the ratios of the mass of trivalent chromium contained in the trivalent chromium compound (A) to the total solid content by mass were 2% and 18%, respectively, and thus the laminated metal plates had low electrolytic solution resistance. Since the aqueous surface treatment agent of Comparative Example 9 contained polyacrylic acid having a weight average molecular weight of 5,000, the laminated metal plate had low electrolytic solution resistance. Since the aqueous surface treatment agent of Comparative Example 10 contained sodium polyacrylate having a solid content acid value of 450 mgKOH/g, the laminated metal plate had low electrolytic solution resistance.

The invention claimed is:

1. An aqueous surface treatment agent for use in metal surface treatment, comprising:
   a trivalent chromium compound (A); a water-soluble or water-dispersible acrylic resin (B); a polyfunctional epoxy compound (C); and a phosphoric acid compound (D),
   wherein the water-soluble or water-dispersible acrylic resin (B) has a weight average molecular weight of 30,000 or more and 1,000,000 or less and a solid content acid value of 500 mgKOH/g or more and 780 mgKOH/g or less,
   a ratio of a mass of trivalent chromium contained in the trivalent chromium compound (A) to a total solid content by mass is 3% or more and 15% or less,
   a ratio of a solid content by mass of the polyfunctional epoxy compound (C) to the total solid content by mass is 1% or more and 15% or less, and
   a ratio of a solid content by mass of the phosphoric acid compound (D) to the total solid content by mass is 5% or more and 25% or less.

2. The aqueous surface treatment agent according to claim 1, wherein the water-soluble or water-dispersible acrylic resin (B) has a solid content hydroxy value of 20 mgKOH/g or less.

3. A surface-treated metal having a coating formed by surface-treating a metal with the aqueous surface treatment agent according to claim 1.

4. The surface-treated metal according to claim 3, wherein the metal is aluminum or an aluminum alloy, iron or an iron alloy, or copper or a copper alloy.

5. The surface-treated metal according to claim 3, wherein the metal is plated.

6. The surface-treated metal according to claim 3, wherein the metal having a coating is laminated.

7. The surface-treated metal according to claim 6, wherein the surface-treated metal is a battery exterior material.

* * * * *